United States Patent

Boehmke et al.

[11] Patent Number: 4,547,199
[45] Date of Patent: Oct. 15, 1985

[54] USE OF ARALKYL POLYALKYLENE GLYCOL ETHERS FOR THE PREPARATION OF AQUEOUS COAL SLURRIES

[75] Inventors: Günther Boehmke, Leverkusen; Jan Mazanek, Cologne; Hans-Jürgen Botsch; Gottfried Schneider, both of Leverkusen, all of Fed. Rep. of Germany

[73] Assignee: Bayer Aktiengesellschaft, Leverkusen, Fed. Rep. of Germany

[21] Appl. No.: 473,898

[22] Filed: Mar. 10, 1983

[30] Foreign Application Priority Data

Oct. 30, 1982 [DE] Fed. Rep. of Germany ..... 32403097

[51] Int. Cl.$^4$ ............................. C10L 1/32; C10L 1/18
[52] U.S. Cl. ........................................... 44/51; 44/77; 252/351; 252/353
[58] Field of Search ..................... 44/51, 77, 78, 76; 252/351, 353; 568/608, 609

[56] References Cited

U.S. PATENT DOCUMENTS 2,630,457  3/1953  Hansen et al. ................. 568/609
4,187,078  2/1980  Shimizu ............................ 44/51
4,302,212  11/1981  Yamamura et al. ............. 44/51
4,358,293  11/1982  Mark ................................. 44/51

FOREIGN PATENT DOCUMENTS 0851858  8/1952  Fed. Rep. of Germany .

Primary Examiner—William R. Dixon, Jr.
Assistant Examiner—Margaret B. Medley
Attorney, Agent, or Firm—Sprung Horn Kramer & Woods

[57] ABSTRACT

Aqueous coal slurries are prepared using aralkyl polyalkylene glycol ethers of the formula

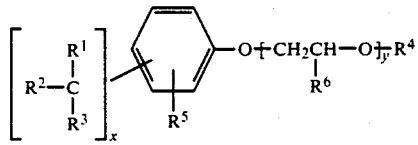

in which
$R^1$ represents an optionally substituted aryl radical,
$R^2$ and $R^3$ are identical or different and denote hydrogen, alkyl or optionally substituted aryl,
$x$ represents a number in the range from 1 to 3,
$y$ represents a number in the range from 1 to 500, and
$R^4$ denotes hydrogen or one of the radicals

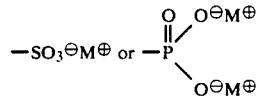

in which
$M^\oplus$ represents a metal ion or ammonium,
$R^5$ denotes hydrogen, alkyl or optionally substituted aryl and
$R^6$ denotes hydrogen or alkyl, it being possible for the radicals $R^6$ in the individual chain members of the polyalkylene glycol chain to be identical or different.

33 Claims, No Drawings

USE OF ARALKYL POLYALKYLENE GLYCOL ETHERS FOR THE PREPARATION OF AQUEOUS COAL SLURRIES

The invention relates to the use of aralkyl polyalkylene glycol ethers for the preparation of aqueous coal slurries.

Slurries of bituminous coal are known from German Auslegeschrift No. 1,141,601. According to this publication, ground bituminous coal can be pumped in the form of aqueous sludges through pipelines to the consumers. Since the conveying capacity depends on the viscosity of the slurry, efforts are being made to reduce the viscosity, while the water content remains the same, by adding surface-active substances or to increase the coal content, while the viscosity remains the same. German Auslegeschrift No. 1,141,601 proposes alkylphenols which are polysubstituted with alkylene oxide and contain, on the nucleus, a saturated or unsaturated, straight-chain or branched hydrocarbon radical with 1 to 30 carbon atoms as surface-active substances.

U.S. Pat. No. 4,302,212 suggests alkyl polyethylene glycol ethers having a sulpho group as surface-active substances to solve the same problem.

However, the known surface-active substances are unsatisfactory for industrial application, since the viscosities of the aqueous coal slurries thus prepared are too high, especially in the case of relatively high solids contents, to enable the slurries to be used as flowable mixtures in industry.

It has been found that aralkyl polyalkylene glycol ethers of the formula

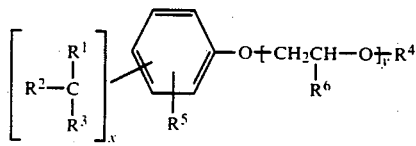

in which
R$^1$ represents an optionally substituted aryl radical,
R$^2$ and R$^3$ are identical or different and denote hydrogen, alkyl or optionally substituted aryl,
x represents a number in the range from 1 to 3,
y represents a number in the range from 1 to 500, and
R$^4$ denotes hydrogen or one of the radicals

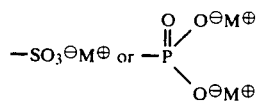

in which
M$^\ominus$ represents a metal ion or ammonium,
R$^5$ denotes hydrogen, alkyl or optionally substituted aryl and
R$^6$ denotes hydrogen or alkyl, it being possible for the radicals R$^6$ in the individual chain members of the polyalkylene glycol chain to be identical or different,
can be used in aqueous coal slurries.

In the context according to the invention, an aryl radical denotes an aromatic hydrocarbon radical from the benzene series with 6 to 18, preferably 6 to 12, carbon atoms. The phenyl, naphthyl and anthracyl radicals may be mentioned in particular.

The aryl radical may be optionally substituted. Possible substituents which may be mentioned are, in particular: straight-chain or branched alkyl radicals with 1 to 18, preferably 1 to 12, carbon atoms, aryl with 6 to 18, preferably 6 to 12, carbon atoms, alkoxy with 1 to 18, preferably 1 to 12, carbon atoms and halogen, such as fluorine, chlorine, bromine and iodine, preferably chlorine.

Possible substituents of the aryl radical which may be mentioned are, in particular, methyl and ethyl.

According to the invention, alkyl denotes a straight-chain or branched hydrocarbon radical with 1 to 18, preferably 1 to 12, carbon atoms. The following alkyl radicals may be mentioned as examples: methyl, ethyl, propyl, isopropyl, butyl, isobutyl, pentyl, isopentyl, hexyl, isohexyl, nonyl, isononyl, octyl, isooctyl and stearyl.

Possible metal ions are essentially those ions which form soluble sulphonium or phosphonium salts. Ions which may be mentioned here as preferred are those of the alkali metals, such as sodium and potassium, and of the alkaline earth metals, such as magnesium and calcium, and ammonium.

The index x indicates by how many radicals the benzene nucleus is substituted. According to the invention, it is, of course, possible to use pure compounds in which x represents an integer from 1 to 3. However, as a result of the preparation process, it is also possible to use mixtures of the aralkyl polyalkylene glycol ethers according to the invention, in which the statistical average of x can also be a fraction in the range from 1 to 3. According to the invention, aralkyl polyalkylene glycol ethers in which x has a value in the range from 2 to 3 are particularly preferred.

The index y indicates the length of the polyalkylene glycol chain. The polyalkylene glycol chain in general consists of 1 to 500 units. As a result of the preparation process, it may of course be that the statistical average of y also assumes a fraction value. y preferably has a value of 10 to 250, and particularly preferably a value of 30 to 150.

R$^6$ as a substituent of the polyalkylene glycol chain can denote hydrogen or lower alkyl (C$_1$ to about C$_6$). It is possible for the radicals R$^6$ in the polyalkylene glycol chain to have different meanings and to be distributed randomly or in blocks.

According to the invention, aralkyl polyalkylene glycol ethers of the formula

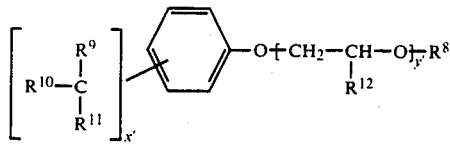

in which
R$^9$ denotes phenyl which is optionally substituted by lower alkyl radicals,
R$^{10}$ and R$^{11}$ are identical or different and denote hydrogen or methyl,
x' represents a number in the range from 2 to 3,
y' represents a number in the range from 10 to 250,
R$^8$ denotes hydrogen, —SO$_3$NH$_4$, —SO$_3$Na or —SO$_3$K and $R^{12}$ denotes hydrogen, methyl or ethyl,
are preferred.

The aralkyl polyalkylene glycol ethers according to the invention are known per se (German Auslegeschrift No. 1,121,814 and German Pat. No. 851,858) and they can be obtained, for example, by polyaddition of alkylene oxide onto aralkyl-substituted phenols and, where appropriate, by reaction of the resulting compounds with anhydrides or acid chlorides of sulphuric or phosphoric acid and subsequent neutralisation of the monoester.

The following aralkyl polyalkylene glycol ethers are particularly preferred: di-[phenethyl]-phenyl polyalkylene glycol ethers, tri-[phenethyl]-phenyl polyalkylene glycol ethers, di- and tri-[methylphenethyl]-phenyl polyalkylene glycol ethers and di-[phenethyl]-isooctyl or -[isononyl]-phenyl polyalkylene glycol ethers, wherein the polyalkylene glycol ether chains can consist of polyethylene oxides, random polyethylenepolypropylene oxide copolymers or polyethylenepropylene oxide block copolymers.

The aralkyl polyalkylene glycol ethers according to the invention are water-soluble. They are in general used in aqueous solution.

The compounds according to the invention are in general handled in aqueous solution in a concentration of 10 to 60% by weight, preferably 20 to 50% by weight, relative to the total solution. In the preparation of the mixtures according to the invention, this solution can then be further diluted to the desired concentration. However, the solid compounds can also be used, in the form of flakes or small beads.

It may be advantageous, especially with high concentrations of the aqueous aralkyl polyalkylene glycol ethers, also to add other organic solvents to reduce the viscosity and thus to facilitate application. Possible solvents are all the water-miscible solvents. Examples which may be mentioned are: lower aliphatic alcohols ($C_1$ to about $C_6$), such as methanol, ethanol, propanol, isopropanol, butanol, isobutanol, pentanol, isopentanol, hexanol and isohexanol.

If additional organic solvents are used, these are in general employed in an amount of 5 to 40% by weight, preferably of 10 to 25% by weight, relative to the solution of the compounds according to the invention.

According to the invention, coal means mineral and processed coal. The following types of coal may be mentioned as examples: anthracite, coke, lignite, moor coal and, in particular, bituminous coal.

According to the invention, coal also includes pure carbon in the graphite modification.

The coal can be used in various particle sizes. Finely ground coal with a particle size of less than 300μ is preferred. A coal powder containing up to 75 to 100% by weight of particles which are smaller than 100μ is particularly preferred.

The aqueous coal slurries according to the invention contain the coal in an amount of 30 to 85% by weight, preferably 55 to 80% by weight.

The aqueous coal slurries according to the invention contain the aralkyl polyalkylene glycol ether in an amount of 0.01 to 5% by weight, preferably 0.2 to 2.0% by weight.

It is possible for the aqueous coal slurries according to the invention also to contain further amounts of other fuels. Examples of other fuels are heating oil, naphtha, crude oil, methanol and ethanol. It is thus possible, for example, for the aqueous coal slurries according to the invention to contain 1 to 60 parts by weight, preferably 1 to 30 parts by weight, of petroleum products.

The aqueous coal slurries according to the invention can be prepared by various processes.

Thus, it is possible first to prepare an aqueous solution of the aralkyl polyalkylene glycol ether and then to add the coal powder, while stirring.

According to another process variant, the aqueous solution of the aralkyl polyalkylene glycol ether is first mixed with coarse-particled coal and this mixture is then ground to a particle size of at most 300μ.

Compared with the known aqueous coal slurries, the aqueous coal slurries according to the invention have improved flow properties. This means that the mixtures contain more coal, while the viscosity remains the same, than the known aqueous coal slurries.

Coal water slurries are non-Newtonian plastic liquids with pseudoplastic behaviour and yield stress. Their viscosity depends on the shear rate (apparent viscosity). The viscosities of the coal water slurries according to the invention range from 3 mPa.s to 5000 mPa.s, preferably from 5 to 2000 mPa.s, at a shear rate of 225 $s^{-1}$.

In addition to the flow properties, the storage properties of the aqueous coal slurries according to the invention are particularly favourable. It is thus possible easily to start the aqueous coal slurries according to the invention moving again, even after storage, and to prevent cementing on temporary settling of the coal. This is particularly advantageous both during transportation and during combustion or further processing of the mixtures.

The aqueous coal slurries according to the invention can be fed directly, without further preparation, to combustion, for example in district heating power stations.

PREPARATION OF THE POLYGLYCOL ETHERS

Example 1

94 g of phenol are reacted with 208 g of styrene in the presence of 1 g of p-toluenesulphonic acid at a temperature rising from 130° to 160° C. After a postreaction of 1 hour at 150° to 160° C., the mixture is cooled to 120° C. 3 g of powdered potassium hydroxide are added and the mixture is heated in order to dry it and to prepare the potassium phenolate. 3,520 g of ethylene oxide are metered into the reaction chamber, which has been gassed with nitrogen, at 130° to 160° C. The reaction product is a water-soluble, yellowish wax which has a melting point of 48° to 50° C.

Example 2

1,160 g of propylene oxide and then 3,520 g of ethylene oxide are added onto the aralkylphenol from Example 1, under the same conditions as described in that example. The reaction product is water-soluble and gives a 30 to 40% strength aqueous solution with no gel formation.

Example 3

94 g of phenol are reacted with 318 g of methylstyrene in the presence of 1 g of p-toluenesulphonic acid at a temperature rising from 130° to 160° C. After a postreaction of 1 hour at 150° to 160° C., the mixture is cooled to 120° C. 3 g of powdered potassium hydroxide are added and the mixture is heated in order to dry it and to form the potassium phenolate. 4,400 g of ethylene oxide are metered into the reaction chamber, which has been gassed with nitrogen, at 130° to 160° C.

The product is readily water-soluble and, at normal temperature, is waxy with a melting point of 58° C.

Example 4

108 g of cresol (technical grade mixture) are reacted with the same amounts of styrene and ethylene oxide under the conditions in Example 1. A water-soluble wax with a melting point of 45° to 47° C. is obtained.

A ready-to-use solution can be prepared with 55 g of this compound and 30 g of water and 15 g of methanol.

Example 5

To prepare an iso-alkyl-substituted product, 220 g of isononylphenol are reacted with 188 g of styrene and 4,400 g of ethylene oxide under the conditions in Example 1. The readily water-soluble wax has a melting point of 43° to 46° C.

Example 6

470 g of the product from Example 3 are dried at 100° C. in vacuo. A mixture of 6 g of urea and 10 g of amidosulphonic acid is then added at 75° C., and the mixture is heated, with thorough stirring, at 90° C. for 1 hour and at 100° to 105° C. for 6 hours. The mixture is then adjusted to pH 7 to 8 (measured in 10% strength aqueous solution) with about 0.5 to 1 ml ammonia solution. This product can be formulated, without a solvent, into a 60% strength aqueous solution.

USE EXAMPLES

Example 7

Bituminous coal having the following properties was used:

| Carbon | 82% |
|---|---|
| Hydrogen | 4.5% |
| Nitrogen | 1.1% |
| Oxygen | 2.6% |
| Sulphur | 1.2% |
| Total moisture | 4.2% |

| Sieve analysis | (sieve residue) |
|---|---|
| 192 μm | 0% |
| 96 μm | 9% |
| 64 μm | 17% |
| 48 μm | 24% |
| 24 μm | 47% |
| 10 μm | 59% |
| 8 μm | 78% |
| 2 μm | 93% |

PREPARATION OF THE AQUEOUS COAL SLURRY 2.25 g of aralkyl polyalkylene glycol ether according to Example 3 (additive) were dissolved in 132.45 g of water. 365.3 g of the abovementioned finely ground coal (that is to say 350 g of dry coal) were added, while stirring. An aqueous coal slurry with a viscosity of 670 mPa.s was formed. The viscosity was measured at 20° C. using a Haake viscosimeter (MV II PSt measuring body); the viscosities given were determined at a shear rate D of 225 s$^{-1}$. Slurries having the following properties were obtained by varying the concentrations of coal or the amount of compound according to the invention (percentages relate to the total mixture):

| % of coal | % of additive | Viscosity [mPa · s] |
|---|---|---|
| 30 | 0.20 | 4 |
| 50 | 0.30 | 36 |
| 70 | 0.45 | 670 |
| 72 | 0.45 | 960 |
| 72 | 0.30 | 1,420 |
| 74 | 0.55 | 2,390 |
| 76 | 0.65 | 2,690 |

Comparison Example 0.45% by weight of a stearyl alcohol polyethylene glycol ether (degree of polyaddition: 100) according to U.S. Pat. No. 4,302,212 was used, under otherwise identical conditions. A 72% strength coal slurry with a viscosity of 1,100 mPa.s was obtained.

Example 8

Bituminous coal having the following properties was used:

| Carbon | 68.2% |
|---|---|
| Hydrogen | 4.3% |
| Nitrogen | 1.4% |
| Oxygen | 9.2% |
| Sulphur | 0.9% |
| Total moisture | 7.9% |

| Sieve analysis | (sieve residue) |
|---|---|
| 192 μm | 0% |
| 96 μm | 11% |
| 48 μm | 31% |
| 24 μm | 53% |
| 16 μm | 63% |
| 8 μm | 78% |
| 2 μm | 94% |

Preparation and measurement of the slurries was carried out as described in Example 7. The aralkyl polyalkylene glycol ether according to Example 3 was used (additive).

Slurries having the following properties were obtained:

| % of coal | % of additive | Viscosity [mPa · s] |
|---|---|---|
| 69 | 0.40 | 1,060 |
| 69 | 0.50 | 810 |

The chain length (y) of the ethylene oxide adduct according to Example 3 was varied (69% of coal; 0.5% of additive).

| y | Viscosity [mPa · s] |
|---|---|
| 16 | 2,000 |
| 27 | 1,120 |
| 50 | 840 |
| 75 | 800 |
| 100 | 810 |
| 125 | 960 |
| 150 | 1,090 |

Comparison Examples

A nonylphenol polyethylene glycol ether (y = 30) according to German Auslegeschrift No. 1,141,601 was used. The viscosity of the slurry was 1,320 mPa.s.

When a stearyl alcohol polyethylene glycol ether (y=50) according to U.S. Pat. No. 4,302,212 was used, a slurry with a viscosity of 980 mPa.s was obtained, under otherwise identical conditions.

Example 9

Bituminous coal having the following properties was used:

| | | |
|---|---|---|
| Carbon | 77.4% | |
| Hydrogen | 4.2% | |
| Nitrogen | 1.5% | |
| Oxygen | 4.1% | |
| Sulphur | 0.9% | |

| Sieve analysis | (sieve residue) |
|---|---|
| 192 μm | 6% |
| 128 μm | 21% |
| 96 μm | 26% |
| 64 μm | 41% |
| 48 μm | 51% |
| 24 μm | 76% |
| 8 μm | 95% |
| 2 μm | 0% |

An aralkyl polyalkylene glycol ether according to Example 3 (additive) was used. The slurry was prepared as described in Example 7.

Slurries having the following properties were obtained (0.5% of additive):

| % of coal | Viscosity [mPa · s] |
|---|---|
| 30 | 5 |
| 50 | 42 |
| 68 | 390 |
| 70 | 620 |
| 72 | 950 |
| 74 | 1,180 |
| 76 | 2,200 |

Effect of the temperature and the pH value (70% of coal, 0.5% of emulsifier):

| | Viscosity [mPa · s] |
|---|---|
| T = 10° C. | 680 |
| 20° C. | 620 |
| 30° C. | 490 |
| pH = 7 | 620 |
| 9 | 610 |
| 11 | 550 |

Example 10

The procedure followed was as in Example 7, but the aralkyl polyalkylene glycol ether according to Example 6 was used (0.5% of additive). Coal slurries having the following properties were obtained:

| Type of coal | % of coal | Viscosity [mPa · s] |
|---|---|---|
| Bituminous coal according to Example 7 | 72 | 1,020 |
| Bituminous coal according to Example 8 | 69 | 910 |
| Bituminous coal according to Example 9 | 72 | 1,050 |

Example 11

An aralkyl polyalkylene glycol ether according to Example 5 (additive) was used to prepare a slurry. A slurry having the following properties was obtained, under conditions otherwise identical to those described in Example 7:

| % of coal | % of additive | Viscosity (mPa · s) |
|---|---|---|
| 70 | 0.45 | 720 |
| 72 | 0.45 | 1,020 |

Example 12

An aralkyl polyalkylene glycol ether according to Example 1 (additive) was used to prepare a slurry. Slurries having the following properties were obtained under conditions otherwise identical to those described in Example 7:

| % of coal | % of additive | Viscosity (mPa · s) |
|---|---|---|
| 70 | 0.55 | 710 |
| 72 | 0.55 | 1,010 |

Example 13

The procedure followed was as described in Example 7 or 8, but some of the water was replaced by methanol. Slurries having the following properties were obtained:

| | % of coal | % of additive according to Example 3 | % of methanol | Viscosity |
|---|---|---|---|---|
| (according to Example 7) | 72 | 0.45 | 10 | 940 |
| (according to Example 8) | 67 | 0.45 | 0 | 960 |
| (according to Example 8) | 67 | 0.45 | 10 | 820 |
| (according to Example 8) | 67 | 0.45 | 33 | 870 |

Example 14

An aralkyl polyalkylene glycol ether according to Example 2 (additive) was used to prepare a slurry. Slurries having the following properties were obtained under conditions otherwise identical to those described in Example 9:

| % of coal | % of additive | Viscosity (mPa · s) |
|---|---|---|
| 68 | 0.55 | 400 |
| 70 | 0.55 | 630 |
| 72 | 0.55 | 980 |

What is claimed is:

1. An aqueous coal slurry containing an aralkyl polyalkylene glycol ether of the formula:

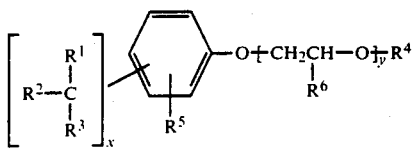

in which
R¹ represents an optionally substituted aryl radical,
R² and R³ are identical or different and denote hydrogen, alkyl or optionally substituted aryl,
x represents a number in the range from 1 to 3,
y represents a number in the range from 1 to 500, and
R⁴ denotes hydrogen or one of the radicals

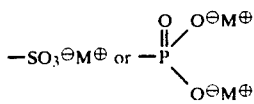

ps in which
M+⊕ represents a metal ion or ammonium,
R⁵ denotes hydrogen, alkyl or optionally substitued aryl and
R⁶ denotes hydrogen or alkyl, it being possible for the radicals R⁶ in the individual chain members of the polyalkylene glycol chain to be identical or different.

2. An aqueous coal slurry according to claim 1, wherein said aralkyl polyalkylene glycol is present in said aqueous coal slurry in an amount of 0.01 to 5% by weight, relative to the total aqueous coal slurry.

3. An aqueous coal slurry according to claim 1, wherein said slurry contains 30 to 85% by weight coal.

4. An aqueous coal slurry according to claim 2, wherein said slurry contains 30 to 85% by weight coal.

5. An aqueous coal slurry according to claim 1, containing a further amount of another fuel.

6. An aqueous coal slurry according to claim 5, wherein said other fuel section group consisting of heating oil, naphtha, crude oil, methanol and ethanol.

7. An aqueous coal slurry according to claim 1, wherein y is 10 to 250.

8. An aqueous coal slurry according to claim 7, wherein y is 50 to 125.

9. An aqueous coal slurry according to claim 1, wherein x is in the range of 2 to 3.

10. An aqueous coal slurry according to claim 1, wherein
R¹ denotes phenol which is optionally substituted by a lower alkyl radical,
R² and R³ are identical or different and denote hydrogen or methyl,
x represents a number in the range of 2 to 3,
y represents a number in the range from 10 to 250,
R⁴ denotes hydrogen, —SO₃NH₄, —SO₃Na or —SO₃K, and
R⁶ denotes hydrogen, methyl or ethyl.

11. An aqueous coal slurry according to claim 1, wherein said coal is present in an amount of 55 to 80% by weight.

12. An aqueous coal slurry according to claim 1, wherein said aralkyl polyalkylene glycol ether is present in an amount of 0.2 to 2.0% by weight.

13. An aqueous coal slurry according to claim 1, wherein R⁴ denotes hydrogen.

14. An aqueous coal slurry according to claim 1, wherein R⁴ denotes a radical —SO₃⁻M⁺, wherein M denotes an alkali metal or alkaline earth metal.

15. An aqueous coal slurry according to claim 1, wherein R⁴ is a radical of the formula:

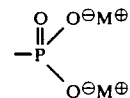

wherein
M⊕ is an alkali metal or alkaline earth metal.

16. An aqueous coal slurry according to claim 1, wherein said coal has a particle size of less than 300 microns.

17. An aqueous coal slurry according to claim 7, wherein said coal has a particle size such that 75 to 100% by weight of the particles are smaller than 100 microns.

18. An aqueous coal slurry according to claim 1, wherein the viscosity of said slurry is in the range of 2 to 5000 mPa.s at a shear rate of 225 s⁻¹.

19. An aqueous coal slurry according to claim 1, wherein the viscosity of said slurry is in the range of 5 to 2000 mPa.s at a shear rate of 225 s⁻¹.

20. An aqueous coal slurry according to claim 1 wherein x is 2-3.

21. An aqueous coal slurry according to claim 20 wherein x is 3.

22. An aqueous coal slurry according to claim 1 wherein R¹ is aryl substituted by methyl or ethyl.

23. An aqueous coal slurry according to claim 20 wherein R¹ is aryl substituted by methyl or ethyl.

24. An aqueous coal slurry according to claim 22 wherein R¹ is aryl substituted by methyl.

25. An aqueous coal slurry according to claim 23 wherein R¹ is aryl substituted by methyl.

26. An aqueous coal slurry according to claim 1 wherein said coal is anthracite, coke, lignite, moor coal or bituminous coal.

27. An aqueous coal slurry according to claim 20 wherein said coal is anthracite, coke, lignite, moor coal or bituminous coal.

28. An aqueous coal slurry according to claim 27 wherein said coal has a particle size of at least 24 μm.

29. An aqueous coal slurry according to claim 27 wherein said coal has a particle size of at least 17 μm.

30. An aqueous coal slurry according to claim 27 wherein said coal has a particle size of at least 9 μm.

31. An aqueous coal slurry according to claim 27 wherein said coal has a particle size of at least 47 μm.

32. An aqueous coal slurry according to claim 20 wherein said coal is mineral coal.

33. An aqueous coal slurry according to claim 20 wherein said coal is mineral or processed coal.

* * * * *

UNITED STATES PATENT AND TRADEMARK OFFICE
CERTIFICATE OF CORRECTION

PATENT NO. : 4,547,199

DATED : October 15, 1985

INVENTOR(S) : Gunther Boehmke, et al.

It is certified that error appears in the above-identified patent and that said Letters Patent is hereby corrected as shown below:

| | |
|---|---|
| Title Page, under "Foreign Application Priority Data" | Delete "32403097" and substitute --3240309-- |
| Col. 1, line 58 | Delete "$M^{\ominus}$" and substitute --$M^{\oplus}$-- |
| Col. 9, line 22 | Before "in which" delete "ps" |
| Col. 9, line 23 | After "M" delete "$+$" |

Signed and Sealed this

Twenty-fifth Day of February 1986

[SEAL]

Attest:

DONALD J. QUIGG

Attesting Officer

Commissioner of Patents and Trademarks